3,565,743
TAPE HAVING A GOLD REFLECTIVE SURFACE ATTACHED TO A GLASS FABRIC CORE AND A PRESSURE SENSITIVE ADHESIVE ON THE OTHER SURFACE
Melvin O. Kalleberg, Minneapolis, and Larry E. Espelien, St. Paul, Minn., assignors to Minnesota Mining and Manufacturing Company, St. Paul, Minn., a corporation of Delaware
Original application June 28, 1965, Ser. No. 467,355, now Patent No. 3,522,074, dated July 28, 1970. Divided and this application Oct. 16, 1968, Ser. No. 831,789
Int. Cl. B32b *13/06, 27/06;* E05d *15/26*
U.S. Cl. 161—93                                    7 Claims

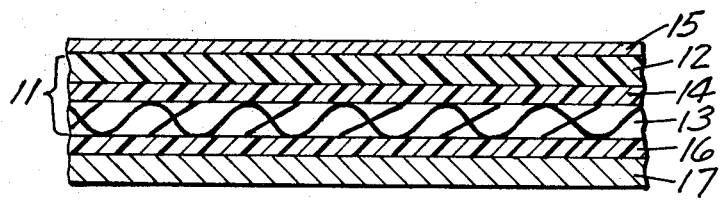

ABSTRACT OF THE DISCLOSURE

The adhesion of vapor-coated gold to polyimide or other high temperature ring-structure films exceeds about 35 ounces per inch of width if the coated film is heated to an elevated temperature, preferably about 250° C. The product is useful in reflecting radiant energy, even at very high temperatures. Pressure-sensitive adhesive tape products are disclosed.

---

This application is a division of applicants' copending application Ser. No. 467,355, now U.S. Pat. 3,522,074 granted July 28, 1970.

This invention relates to a novel means for and method of protecting surfaces which are susceptible to damage by infrared radiation.

The ability of a surface to reflect radiant energy is dependent upon both the surface and the wave length of the energy. The most damaging portion of the electromagnetic spectrum in terms of the generation of heat involves wave lengths in the range of 0.8 to 2 microns, i.e., in the near infrared range. The approximate reflective ability of selected metals in this range is shown below, all figures being reported as percent of normally incident wave energy which is reflected by a polished surface of the metal named.

| Metal: | Reflectance |
|---|---|
| Silver | 97–98 |
| Gold | 95–97 |
| Copper | 90–96 |
| Rhodium | 84–91 |
| Zinc | 80–92 |
| Magnesium | 74–77 |
| Cadmium | 72–87 |
| Nickel | 72–84 |
| Aluminum | 71–82 |
| Iron | 65–78 |
| Tungsten | 62–85 |
| Antimony | 55–60 |
| Tin | 54–61 |
| Silicon | 28 |

From the foregoing tabulation, it may readily be inferred that the infrared reflecting ability of copper, gold, and silver is outstanding. Copper and silver, however, are both subject to tarnishing when exposed to high temperatures, and hence quickly lose their reflecting ability when heated. Although it is sometimes satisfactory to coat a corrosion-preventing resin over the surface of the metal, this technique is unsatisfactory when high temperatures are reached, since the coating itself quickly disintegrates. All such coatings absorb infrared energy to a considerable extent. Hence, where high ambient temperatures are encountered, gold is by far the most satisfactory reflector available. Gold has the additional advantage of extremely low emissivity, on the order of 0.02 to 0.03, and hence minimizes dissipation of heat by radiation.

Gold's outstanding heat-reflecting and emissivity features have long been recognized but, because of its costliness, it can be employed only in extremely thin layers for most purposes. One common technique for applying thin coatings of metal to a surface is vapor deposition, in which a substrate to be coated is placed in a high vacuum, the plating metal being evaporated and condensed on the surface of the substrate. Although gold has been vapor plated on a variety of substrates, its adhesion is notoriously poor, especially for organic substrates such as polymeric film. Since the adhesion is likely to be so poor that the gold will rub off even during careful handling, it is common to protect the gold layer by either applying a resin coating thereover or by turning it away from the source of greatest danger, forcing the wave energy to pass through the polymeric film to reach the reflective surface.

The effectiveness of a gold-coated film is necessarily governed to some degree by the film itself. Even the modest amounts of infrared radiation which are transmitted through the gold or absorbed thereby (respectively 1% and 3% at a thickness of 500 angstroms, and 0% and 3.5% at a thickness of 1000 angstroms) is likely to destroy many backing materials, particularly if the temperature is high or if the exposure continues for a long period of time. There have recently been developed a family of polymers, based on oxidation-resistant ring compounds, which are capable of resisting extremely high temperatures without being deleteriously affected and degraded. Many of these materials maintain their desirable properties to a substantial degree at temperatures in excess of 250° C., some of them continuing to function above 700° C. Some films actually have zero strength temperatures higher than that of aluminum.

A marriage of gold and the new high performance polymers, although desirable, is fraught with the old problem—how to obtain truly satisfactory adhesion of gold to films of the materials just specified. Thus, no matter what priming techniques have been heretofore employed, no way was known to obtain adhesion good enough even to pass the traditional "tape test," where a conventional normally tacky and pressure-sensitive adhesive tape is applied to the metal surface of a vapor coated film and slowly removed therefrom, adhesion being deemed satisfactory if the metal layer does not wholly or partially transfer to the adhesive layer.

The present invention provides a novel structure having a high temperature-resistant polymeric film to at least one surface of which is firmly adhered an extremely thin layer of gold. Adhesion of the gold to the film backing, as measured by applying a standard normally tacky and pressure-sensitive adhesive tape to the surface thereof, thereafter doubling the tape back parallel to itself, and measuring the force required to strip it away in a tensile tester, is found to be in excess of bout 35 ounces per inch of width. In fact, such "stripback" adhesion is frequently twice this value. When interposed between an infrared heat source and an object which is to be protected from heat, with the gold surface disposed toward the heat source, such films provide exceptional protection, even at ambient temperatures as high as 800° C. When wrapped around an object within which it is desired to retain heat, these novel structures are equally outstanding.

The surprising adhesion of gold to the high temperature polymer films just described is obtained in an extremely simple, but totally unobvious manner. After vapor coating a layer of gold on the surface of the film, the structure is heated to an elevated temperature, preferably in excess of about 250° C., for a period of time which is inversely related to the temperature employed. For example, exposure of a gold-coated polyimide film to a temperature of 315° C. for 15 seconds changes a product from which the gold can be removed with a finger or an ordinary eraser to a firmly anchored durable product which can resist severe mechanical flexing, handling, stretching, and even mild abrasion, without losing its integrity. Decreasing the temperature to 280° C. increases the time required to approximately 5 minutes, while at 260° C. approximately 40 minutes is required. Temperatures reduced significantly below 250° C. are far less attractive, since at, e.g., 250° C., over 15 hours of heat treatment is required to give comparable anchorage, while heating 48 hours at 200° C. still does not yield products having adhesion comparable to that obtainable by much briefer heating at higher temperatures. At 175° C., equivalent adhesion is not obtained after 175 hours of exposure.

Neither microscopic examination nor X-ray diffraction studies of heat-treated gold coated films reveals any structural differences, in comparison with gold coated films which have not been heat treated, insofar as they can be related to the adhesion levels of the two products. Although it is not fully understood what takes place during the heat treating process, and although it is not intended to rely on any specific theory, it is hypothesized that the gold atoms may be migrating into the free volume in the polymer network. Some anomalies indicating this possibility have been noted in close comparative examination of heated and unheated samples by electron beam diffraction experiments. At any rate, it is surprising that this simple treatment provides adequate—let alone outstanding—adhesion, especially in view of the facts that gold is almost unique in its inertness, and that the high performance films, which are not oriented, neither relax nor show any tendency to melt at the temperatures employed.

As an aid to understanding this invention, the accompanying drawing is provided. In the drawing, which represents a preferred embodiment of this invention, backing 11 comprises high performance film 12 and glass cloth 13, the film and the cloth being laminated together by heat resistant adhesive 14. To the exposed surface of film 12 is firmly bonded gold layer 15. The opposite surface of glass cloth 13 is provided with heat resistant normally tacky and pressure-sensitive adhesive layer 16, the surface of adhesive 16 being covered and temporarily protected with liner 17.

The following examples illustrates the manufacture of presently preferred embodiments of this invention, but are not intended to limit the scope of the invention in any way.

EXAMPLE 1

A one-mil yellow-colored aromatic polypyromellitimide film [the polycondensation reaction product of pyromellitic dianhydride and bis-(4 amino phenyl) ethyl], having an ultimate tensile strength of 25,000 p.s.i. at 25° C., a density of 1.42, and a zero strength temperature of 815° C. (available commercially from E. I. du Pont de Nemours & Company, Inc. as "H film") was vapor coated on one surface with approximately 1000 angstroms of gold. When held to the light the gold coated film transmitted green but appeared to be opaque to other colors. Upon removal of the coated film from the vacuum coater, the gold could readily be brushed off with the fingers, a pencil eraser, or a damp linen towel, and was completely removed by applying conventional normally tacky and pressure-sensitive adhesive tape and stripping it away. The gold coated film was then placed in a 315° C. oven for 10 minutes, after which the gold was found to be firmly anchored, to resist vigorous rubbing, and to show no transfer when a strip of normally tacky pressure-sensitive adhesive tape was applied and removed.

The outstanding adhesion of the gold layer to the film was further demonstrated by adhering the uncoated surface of the film to a rigid aluminum panel to render the structure rigid. To the gold surface was then applied a splicing tape (comprising a drills cloth backing coated on one face with butadiene:acrylonitrile rubber blended with phenol-formaldehyde resin and esterified rosin), the splicing tape and gold coated film being laminated together in a press maintained at 165° C. under a pressure of 50 p.s.i. for two minutes. After the laminate was cooled, one end of the splicing tape was peeled away from the gold and doubled back over itself so that its two ends extended in the same direction. The aluminum-reinforced film was then placed in the stationary jaw of a tensile tester and the free end of the splicing taped placed in the movable jaw, after which the jaws were moved apart at the rate of 12 inches per minute. The force required to remove the splicing tape was approximately 70 ounces per inch of width, and there was no apparent transfer of gold to the adhesive surface. In other words, the adhesion of the gold to the polyimide film backing was regarded as greater than 70 ounces per inch of width. The gold-coated film possessed utility as an infrared reflector for protecting surfaces which were otherwise degraded by infrared radiation.

A 1:1 blend of a rubbery polymer of dimethyl silicone and a silicone resin (commercially available in 60% xylene solution, under the trade designation "C 280" from the Dow Corning Corporation) was placed in a paddle mixer and 30% by weight of finely divided rutile titanuim dioxide added, based on the silicone solids. The composition was crudely mixed and then removed and further blended on a conventional paint mill, after which a propeller mixer was used to mix in sufficient xylene to reduce the overall solids content to 35%, and 2% benzoyl peroxide catalyst, based on resin solids. Each side of a basket weave glass cloth having a thread count of 60 x 47, weighing 1.44 ounces per square yard, and having a thickness of 0.002 inch, were then coated with approximately 25 grains per 24 square inches (solids basis) of the silicone adhesive and the solvent evaporated. An alkyd resin-saturated 35-lb. crepe paper liner, having a polyurethane release coating of the type described in U.S. Pat. 2,532,011, was then temporarily laminated to one adhesive-coated surface. To the opposite surface was laminated the uncoated surface of the polyamide film. The resultant composite product was a normally tacky and pressure-sensitive adhesive tape which was strong, conformable, and extremely resistant to high temperatures. When applied to the aluminum fuselage of jet airplanes in the area adjacent the jet blast, fatigue of heat-exposed aluminum structures is avoided by greatly reducing operational temperatures. For many years a leading aircraft company had maintained an open requisition for a product to perform this function, but that need remained unfilled until the product just described was prepared. The product was also useful for lining the inside of engine cells and for protecting instrument boxes in steel mills, where it shows no sign of corrosion or loss of effectiveness after long periods of exposure to high temperatures. The extremely low emissivity of the gold surface also makes this product useful in greatly curtailing heat loss from space capsules, hydraulic lines, electronic black boxes, missile fuel tanks, and the like. The protection of these structural components is achieved at very little increase in weight to the total structure.

EXAMPLE 2

A 2-mil film of aluminum foil was knife-coated with an 11% solids solution of a polyaryl sulfone in dimethyl acetamide and the solvent evaporated in an air-circulating oven to leave a film approximately 1 mil thick. The polyaryl sulfone is a high molecular weight polymer having the following type of repeating unit in its structure:

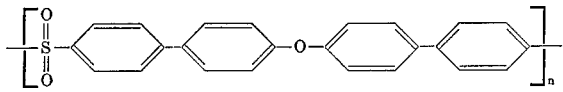

The polymer-coated surface was then vapor-coated with a 1000-angstrom thickness of gold. Upon removal of the laminate from the vapor coater, the adhesion was found to be extremely poor, being readily removable by even mild rubbing. The laminate was then placed in an oven maintained at 315° C. for a period of ten minutes. Upon removal, the entire laminate was found to be firmly united, and the adhesion of the gold for the polyaryl sulfone was found to exceed 35 ounces per inch of width.

The foregoing examples are merely illustrative of the ways in which the present invention can be employed. To illustrate, the glass cloth may be replaced with other suitable laminae, depending upon the durability, strength, heat resistance, etc. desired. For many applications, particularly where excessive thickness can not be tolerated, a normally tacky and pressure-sensitive adhesive tape may be formed by providing the film directly with a layer of normally tacky and pressure-sensitive adhesive. Similarly, where thickness is of less importance but where it is essential to obtain even greater insulative value, the backing may include a layer of foam, e.g., a form of the high performance polymer. Likewise, although the silicone pressure-sensitive adhesive is extremely desirable where heat resistance is of prime concern, other normally tacky and pressure-sensitive adhesives may be employed to advantage; e.g., where it is important to obtain extremely good anchorage to a metal surface, such as aluminum, acrylate adhesives of the type described in Ulrich Reissue Pat. 24,906 are particularly advantageous.

The polyimide film described in the preceding example is, as indicated, merely one member of a family of high temperature resistant polymers which may be employed. These high performance polymers are based on the concept that molecular configurations which contain a minimum of aliphatic CH groups will be less susceptible to attack and degradation in the presence of high temperatures. Stiffness and structural integrity of the films are also maintained at high temperatures by the preponderance of cyclic configuration in the chain. Polymeric materials which have proved effective are thus typically based on ring structures which may be heterocyclic (of which the polyimide films represent one example), aromatic, or at least partially saturated polymers including polybenzoylene benzimidazoles of the type

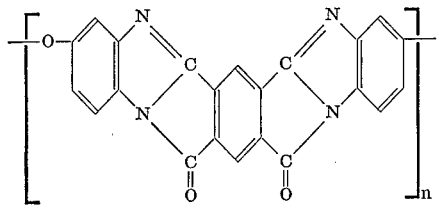

other polybenzimido-group-containing polymers having heterocyclic moieties in the backbone thereof; poly(phenyleneoxide); polybenzothiazoles prepared by the solution of polycondensation of the aromatic bis(o-mercapto amines) and aromatic dicarboxylic acids; polyquinoxylenes such as poly [2,2'-(1,4-phenylene)-6,6' diquinoxylene]; polydisilatrioxane of the type

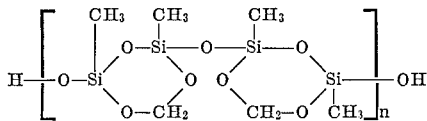

aromatic polyimides such as those based on pyromellitic dianhydride and m-phenylene diamine, and poly(aromatic-heterocyclic) polymers such as those based on tetraazopyrene derivatives and similar polymers.

It will also be apparent that this invention may be practiced in ways other than those described hereinabove. For example, it may be desirable to employ relatively thick layers of high-performance polymers instead of the more flexible films. Likewise, it may be desirable to deposit the gold in a predetermined pattern, for example, as in a component for a printed circuit. Similarly, although the high heat-reflecting and low emissivity characteristics of gold are of vital importance in the applications described herein, the decorative nature of products having a gold exterior should not be overlooked, and polymeric substrates having firmly anchored gold coatings thereon may find utility for their beauty alone.

What is claimed is as follows:

1. The method of protecting objects from the deleterious effects of infrared heat comprising the steps of interposing between said object and the source of infrared heat a structure comprising a sheet material which is a film of an organic polymer capable of enduring temperatures in excess of 500° C. and selected from the group consisting of polyimides, polyaryl sulfones, polybenzoylene, benzimidazoles, poly(phenylene oxide), polybenzothiazoles, polyquinoxylenes and polydisilatrioxane, said sheet material having, at the outermost portion of the face exposed to the said infrared source, an extremely thin layer of gold, the force required to remove the layer of gold from the sheet material being in excess of about 35 ounces per inch of width.

2. Strong heat-resistant normally tacky and pressure-sensitive adhesive tape, especially suited for application to a substrate to protect the substrate from infrared radiation, said tape comprising in combination a laminated backing formed of a woven glass cloth and a high temperature-resistant polymeric film whose chemical structure consists essentially of ring units and which is selected from the group consisting of polyimides, polyaryl sulfones, polybenzoylene benzimidazoles, poly(phenylene oxide), polybenzothiazoles, polyquinoxylenes and polydisilatrioxane, a normally tacky and pressure-sensitive adhesive on the glass cloth surface of said backing, and a thin layer of gold on the film surface of said backing, the adhesion of said gold to said film being on the order of at least 35 ounces per inch of width.

3. The tape of claim 2 wherein the normally tacky and pressure-sensitive adhesive is a silicone-based composition.

4. The tape of claim 2 wherein the film is the polycondensation reaction product of pyromellitic dianhydride and bis-(4-amino phenyl) ether.

5. The method of improving the adhesion of a vapor coated gold layer to the surface of a high temperature-resistant polymeric film, which is selected from the group consisting of polyimides, polyaryl sulfones, polybenzoylene benzimidazoles, poly(phenylene oxide), polybenzothiazoles, polyquinoxylenes and polydisilatrioxane, for which film the gold normally has adhesion such that it can readily be removed by stripping off with a piece of normally tacky and pressure-sensitive tape, said method comprising heating said vapor coated film to a temperature in excess of 250° C. for a period of time sufficient to obtain an anchorage of at least 35 ounces per inch of width.

6. The method of claim 5 in which the temperature is at least 300° C.

7. An object which is normally subject to deleterious effects caused by exposure to infrared radiation but which is protected therefrom by having adhered to the surface for which protection is desired, a heat-resistant sheet material which consists essentially of a polyimide film having firmly anchored to the exposed surface thereof a thin layer of gold, the adhesion of said gold to the surface of said film being at least about 35 ounces per inch of width.

References Cited

UNITED STATES PATENTS

| | | | |
|---|---|---|---|
| 3,082,510 | 3/1963 | Kelly et al. | 161—214X |
| 3,165,265 | 1/1965 | Clause | 161—214X |
| 3,012,906 | 12/1961 | Anspon | 117—160X |
| 2,689,805 | 9/1954 | Croze et al. | 117—65 |
| 3,179,634 | 4/1965 | Edwards | 260—78 |

JOHN T. GOOLKASIAN, Primary Examiner

C. B. COSBY, Assistant Examiner

U.S. Cl. X.R.

117—68.5, 122, 138.8, 160; 161—82, 167, 187, 207, 213, 214, 406